UNITED STATES PATENT OFFICE.

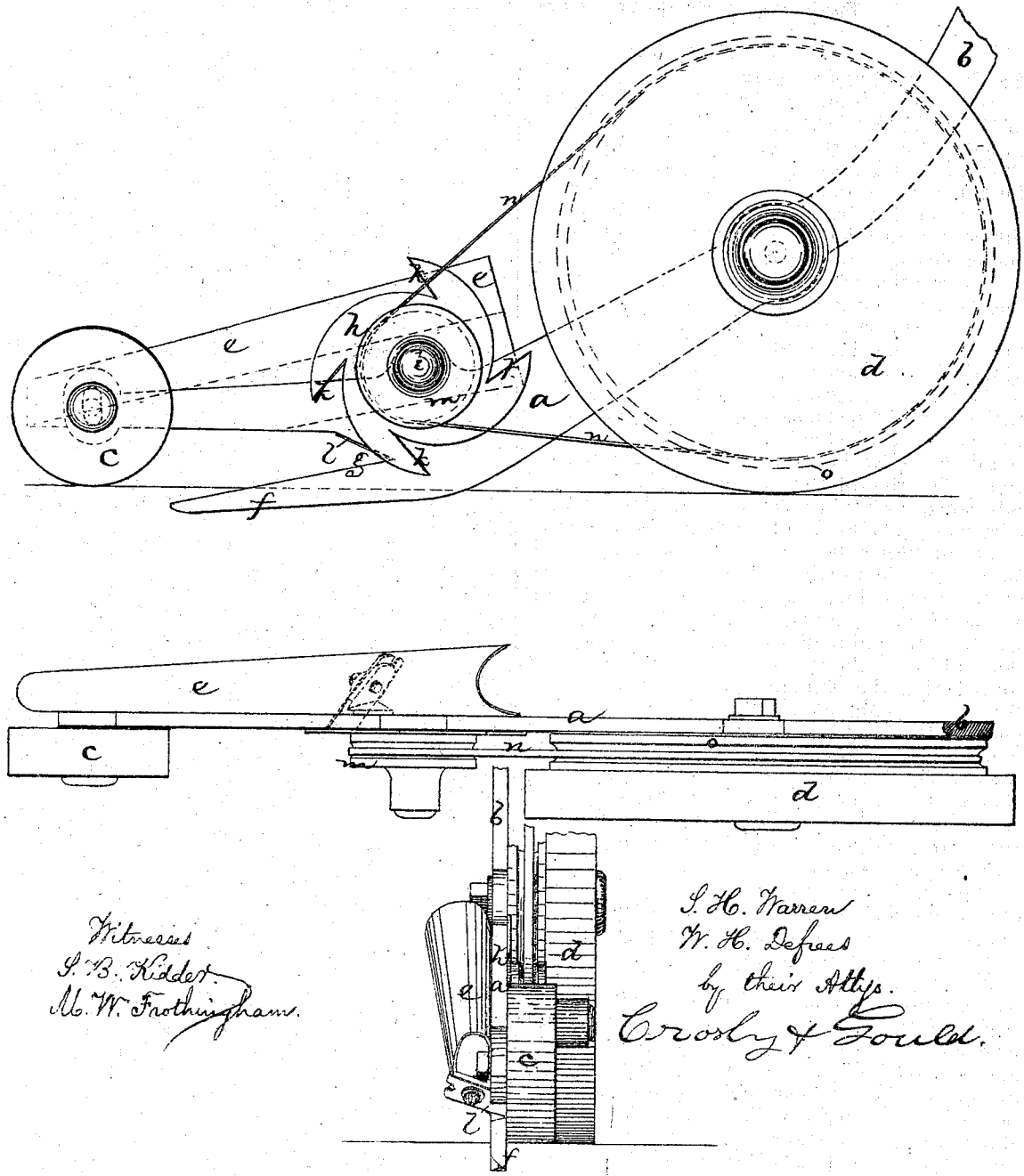

SAMUEL H. WARREN, OF WESTON, AND WILLIAM H. DEFREES, OF NEWTONVILLE, MASSACHUSETTS.

IMPROVEMENT IN MACHINES FOR REMOVING RUNNERS FROM STRAWBERRY VINES.

Specification forming part of Letters Patent No. 117,705, dated August 1, 1871.

*To all whom it may concern:*

Be it known that we, SAMUEL H. WARREN, of Weston, and WILLIAM H. DEFREES, of Newtonville, both in the county of Middlesex and State of Massachusetts, have invented a Machine for Removing Runners from Strawberry Vines; and we do hereby declare that the following, taken in connection with the drawing which accompanies and forms part of this specification, is a description of our invention, sufficient to enable those skilled in the art to practice it.

Our invention relates to the construction of a machine for cutting off the runners of strawberry vines. In the modern culture of strawberries it is the practice to grow the plants in hills or rows rather than in beds, severing the runners from the old vines instead of "pegging" the new plants made by the runners or allowing them to root. To trim off the runners by hand is very laborious, and in the extensive cultivation of strawberry plants is well nigh impossible, or at least impracticable. In our invention we substitute for the hand-clipping, and for a turf-cutter or trimmer, (which is sometimes employed,) a wheel-machine, having a guard for lifting the leaves of the old plants, a finger for passing under and lifting the runners, and a knife or cutter for severing the runners held up by the finger, the whole being mounted upon wheels, which enables the machine to be easily operated, and which guides the runner-finger as it moves forward. The invention consists in the combination of the cutter, the runner-finger for raising the runners and presenting them to the action of the cutter, and leaf-guard for protecting the old plants from the action of the cutter.

The drawing represents a machine embodying our invention. A shows the machine in side elevation. B is a front view. C is a plan of it.

*a* denotes the frame, made of wood or of metal, and having a handle, *b*, extending rearward from it. Mounted upon suitable stud-pins projecting from this frame are wheels *c d*, the front or leader-wheel *c* being a guide and gauge-wheel, and the rear wheel *d* a guiding, gauging, and driving-wheel. On one side of the frame *a* is bolted a guard-plate, *e*, the front end of which stands at some distance above the ground, or above the plane of the treads of the two wheels *c d*, and the top of which inclines upward, as seen at A. Under the frame *a* is a long tooth or finger, *f*, the point of which extends below the plane of the tread of the two wheels *c d*, as seen at A, and the top of which inclines upward, as seen at A, the finger and the bottom plate of the frame *a* making an angle, *g*. The point of the finger enters the ground slightly so as to insure its passing beneath the runners, and as the machine moves forward the runner-stems pass up the incline until they reach or come into the angle *g*, at which point they are severed by the cutter. *h* denotes a rotary cutter or cutter-wheel, hung upon a pin, *i*, extending from the frame *a*, and having a series of cutting-teeth, *k*. In the rotation of the wheel *h* the cutting-edge of each tooth moves against the angle *g* and severs any stems or runners coming between it and the point of the angle. The cutting-edges may act simply in connection with the face of the frame, or there may be a stationary cutting-edge or cutter, *l*, affixed in the frame and extending through the angle *g*. The cutter-wheel *h* has fixed to it a pulley, *m*, connected by a band, *n*, with a pulley, *o*, on the driving-wheel *d*, so that the rotation of the wheel *d* upon the ground drives the rotary cutter-wheel. The cutter may be a reciprocating instead of a rotary cutter, but we prefer the rotary cutter, operating substantially as described.

In using the machine the front or leader-wheel *c* is driven close up to the plants, and the guard *e* passes under the leaves and lifts them up out of the path of movement of the cutter-wheel, and the point of the finger *f*, running in the ground, takes up the runner-stems, which, passing up over the top of the finger, are by it brought under the action of the cutter, so that the machine thus trims off the runners without subjecting the vines to injury.

We claim—

The combination of the guide-wheels *c d*, the cutting mechanism, the runner-finger *f*, and the leaf-guide *e*, substantially as shown and described.

SAMUEL H. WARREN.
WILLIAM H. DEFREES.

Witnesses:
FRANCIS GOULD,
M. W. FROTHINGHAM.